W. F. BUTLER.
METHOD OF AND APPARATUS FOR POSITIONING AND CUTTING FISH.
APPLICATION FILED APR. 6, 1918.
1,320,990.
Patented Nov. 4, 1919.
7 SHEETS—SHEET 2.
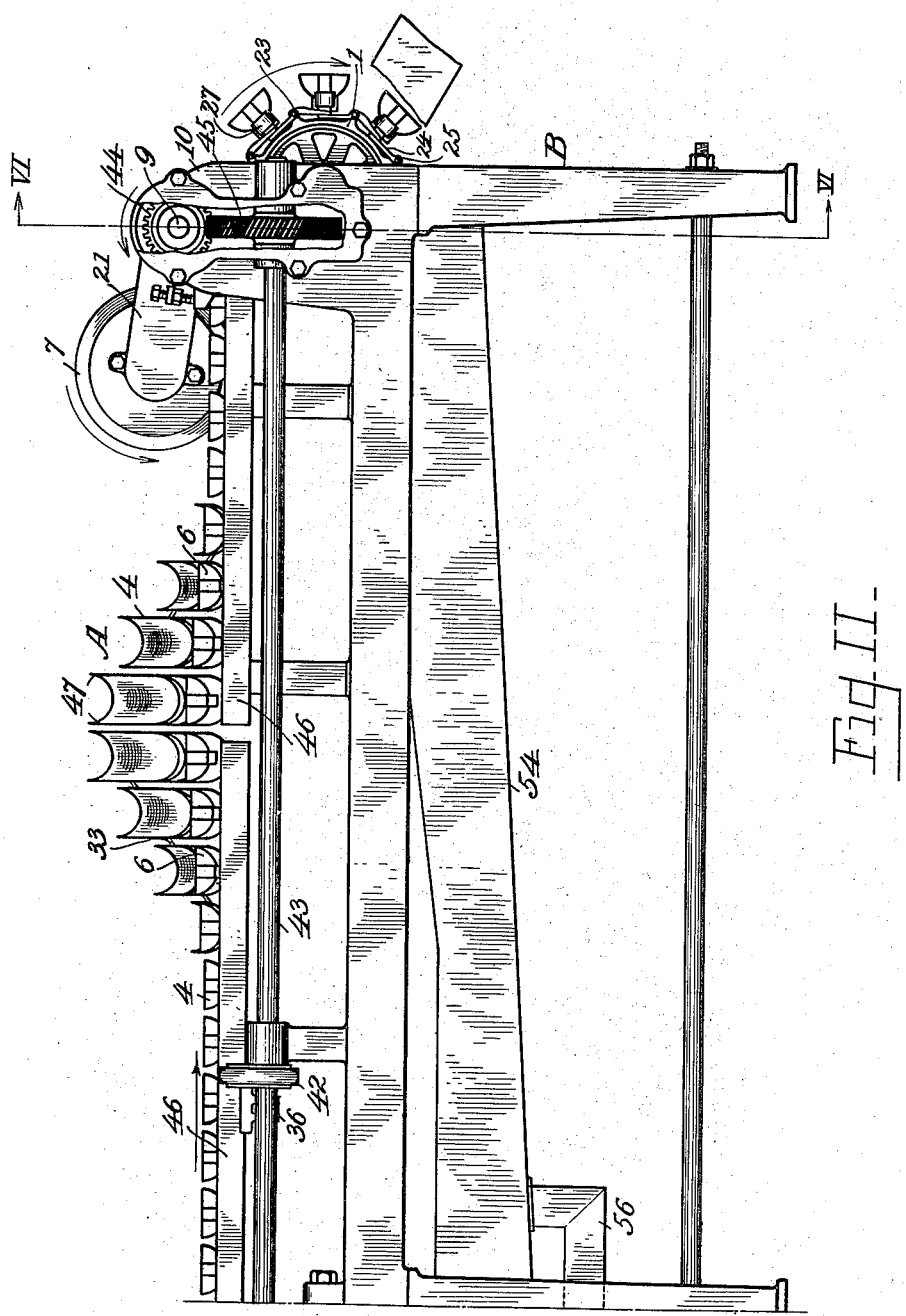
INVENTOR.
William F. Butler
BY
H. N. Low
ATTORNEY

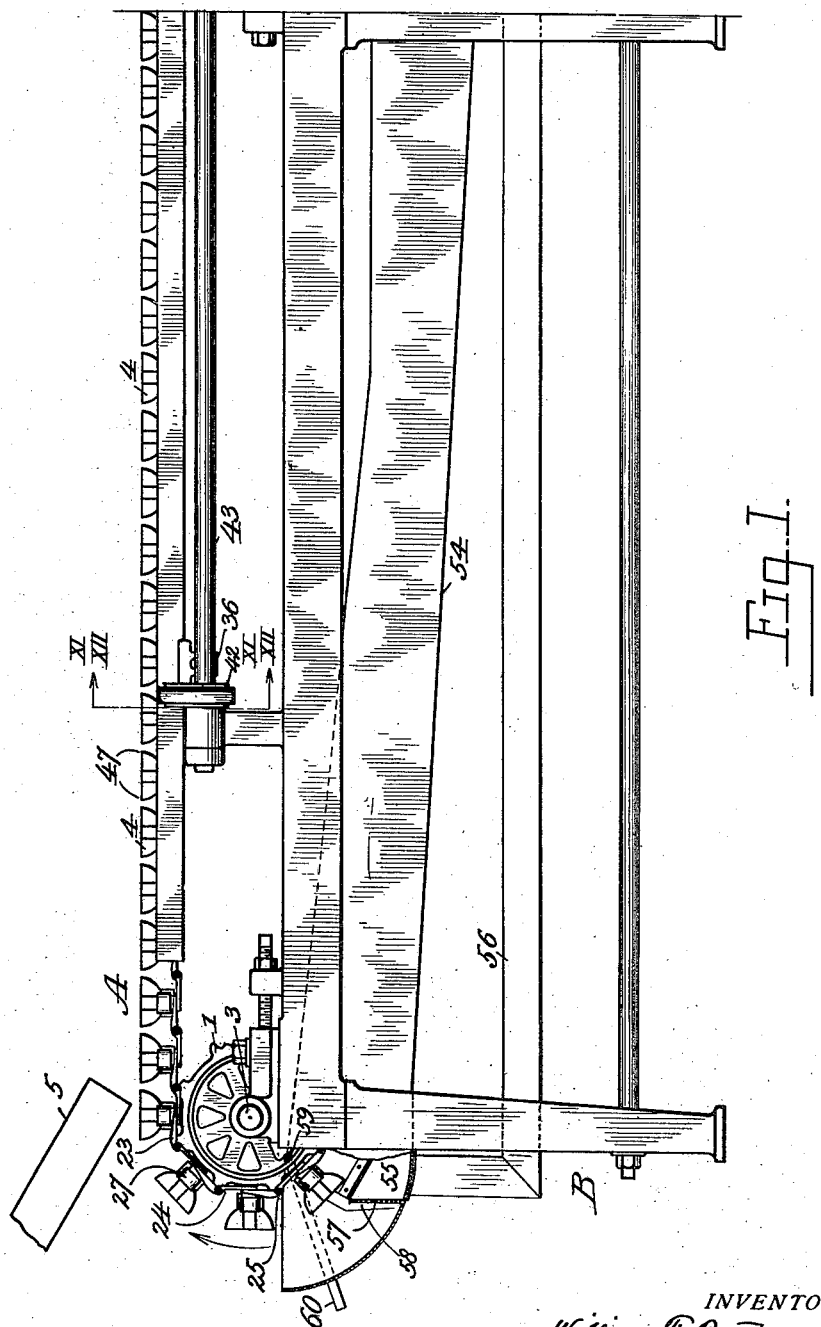

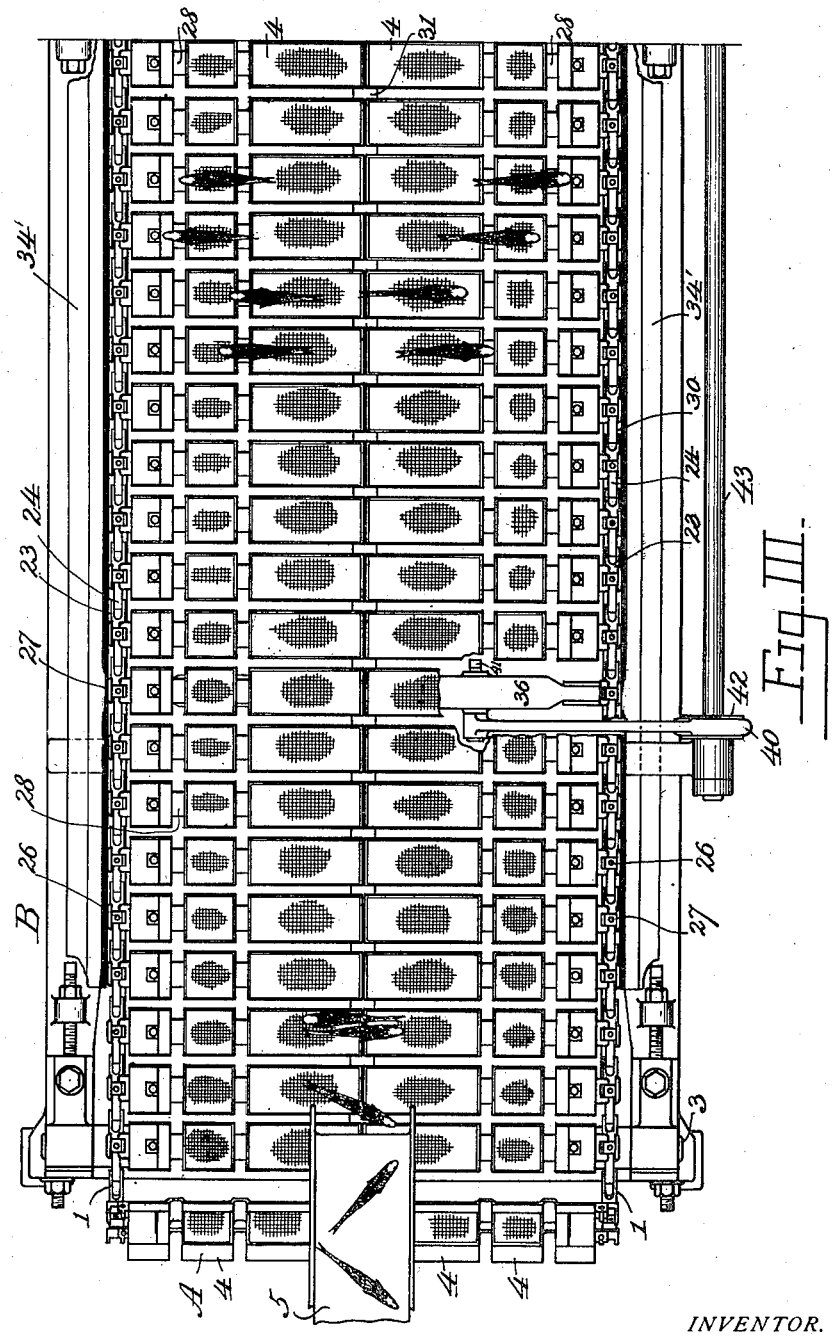

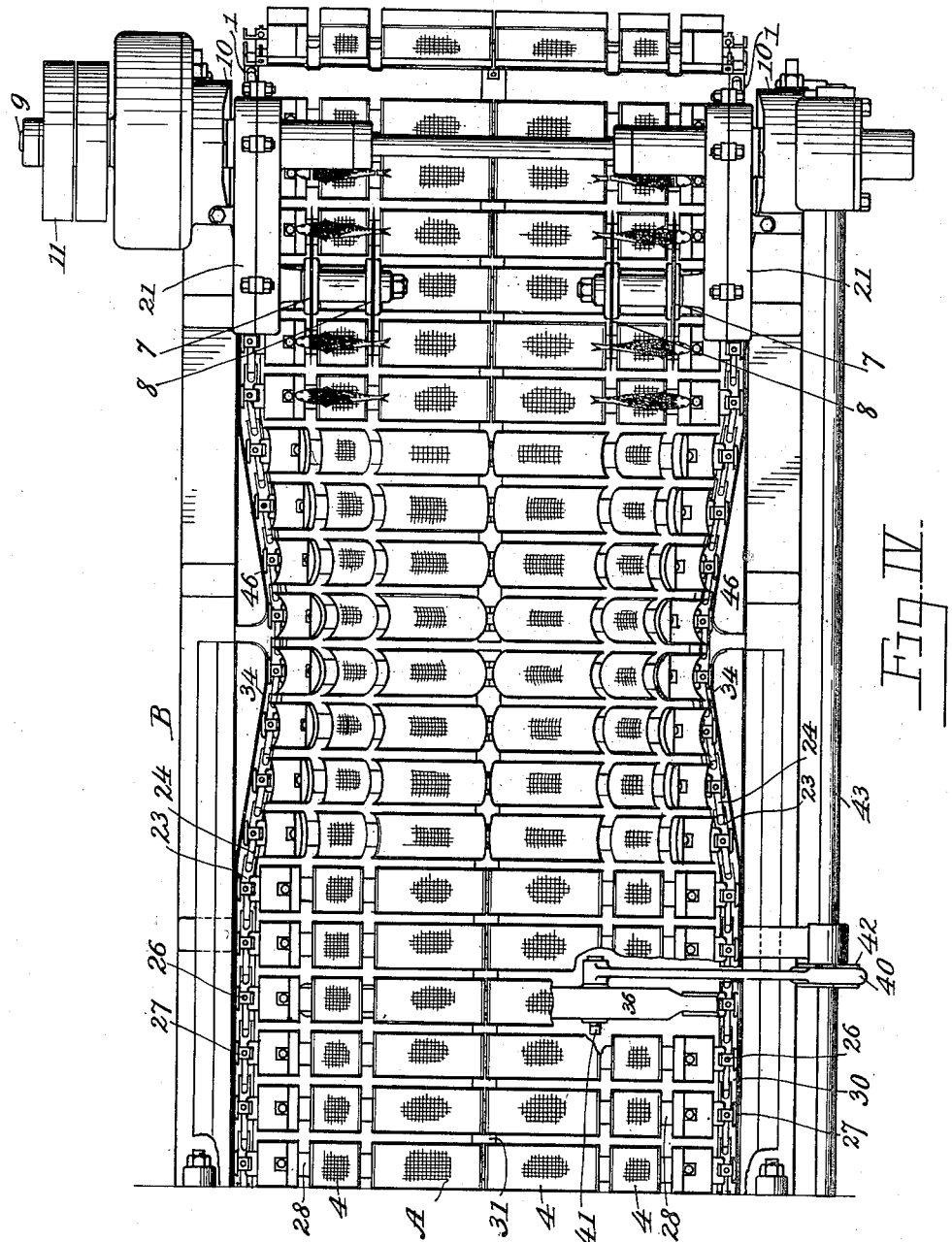

W. F. BUTLER.
METHOD OF AND APPARATUS FOR POSITIONING AND CUTTING FISH.
APPLICATION FILED APR. 6, 1918.
1,320,990.
Patented Nov. 4, 1919.
7 SHEETS—SHEET 5.
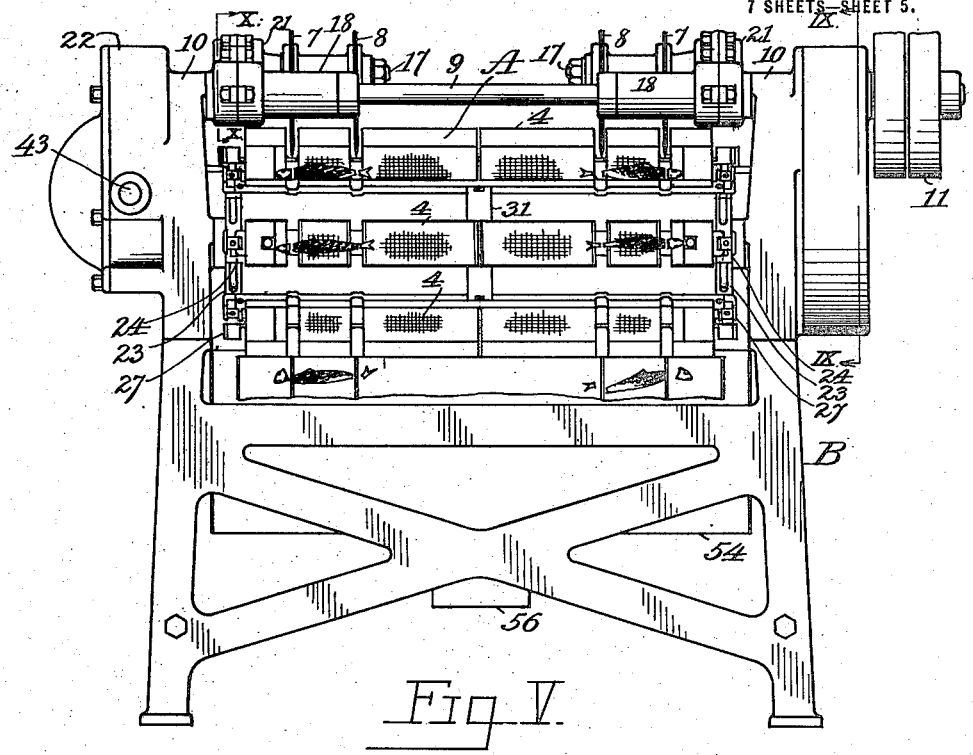
Fig. V.
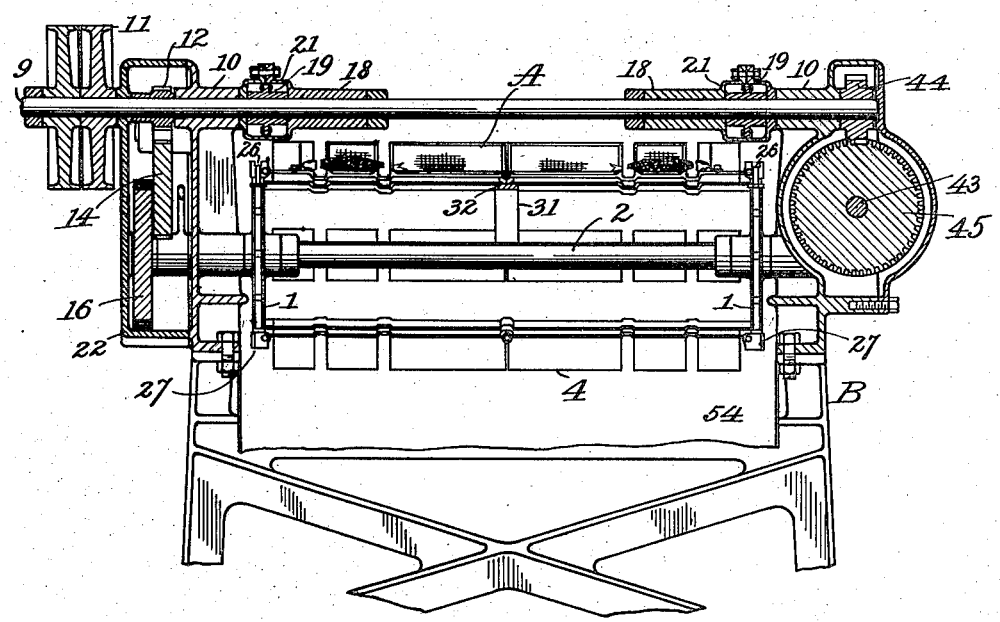
Fig. VI.
INVENTOR.
BY William F. Butler
ATTORNEY

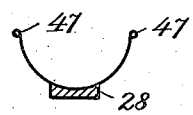
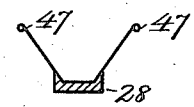
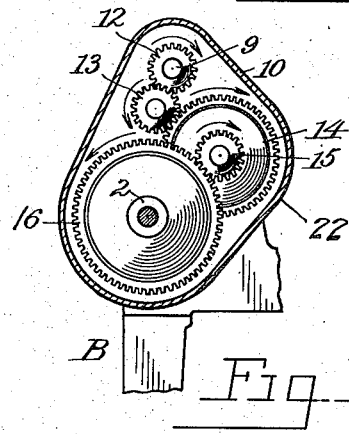
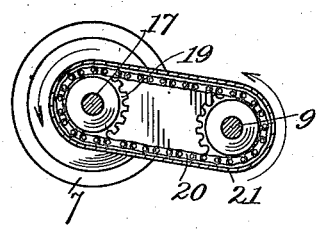
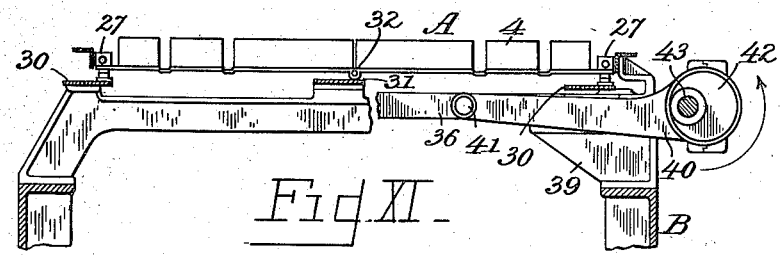
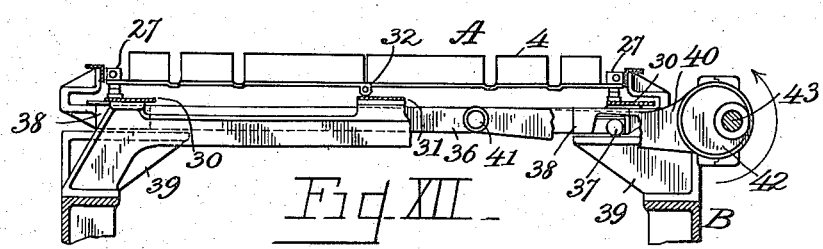

W. F. BUTLER.
METHOD OF AND APPARATUS FOR POSITIONING AND CUTTING FISH.
APPLICATION FILED APR. 6, 1918.
1,320,990.
Patented Nov. 4, 1919.
7 SHEETS—SHEET 7.
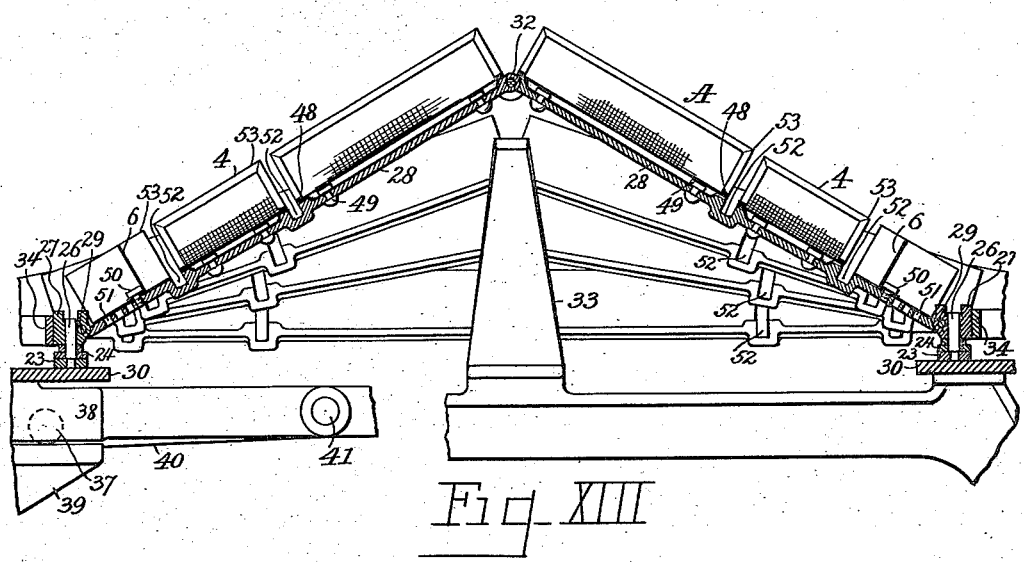
Fig. XIII
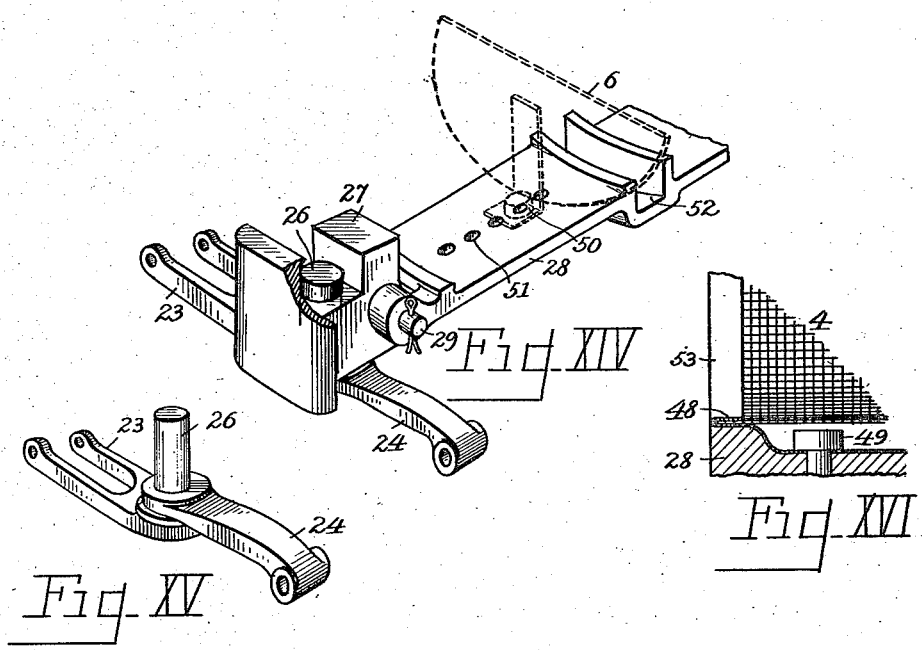
Fig. XIV
Fig. XV
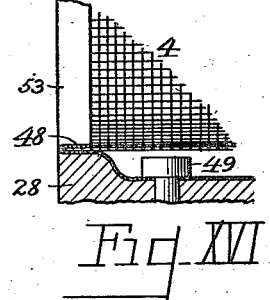
Fig. XVI
INVENTOR.
William F. Butler
BY
N. N. Loer
ATTORNEY

UNITED STATES PATENT OFFICE.

WILLIAM F. BUTLER, OF FAIRPORT, NEW YORK, ASSIGNOR TO AMERICAN CAN COMPANY, OF NEW YORK, N. Y., A CORPORATION OF NEW JERSEY.

METHOD OF AND APPARATUS FOR POSITIONING AND CUTTING FISH.

1,320,990.     Specification of Letters Patent.     Patented Nov. 4, 1919.

Application filed April 6, 1918. Serial No. 227,076.

*To all whom it may concern:*

Be it known that I, WILLIAM F. BUTLER, a citizen of the United States, residing at Fairport, in the county of Monroe and State of New York, have invented certain new and useful Improvements in Methods of and Apparatus for Positioning and Cutting Fish, of which the following is a specification.

The invention relates to a method of uniformly positioning fish, from any mass of the same in which the individual fish are irregularly disposed, for the purpose of eliminating all or much of the hand labor and greatly increasing the rapidity of the operation and amount of fish operated on in any unit of time, such positioning being for the purpose of performing useful operations on the fish to prepare them for packing or for the market. I have illustrated this method in connection with decapitating the fish when uniformly positioned at a plane of gaging and cutting, and I may at the same time cut off the tails of the fish unless they are too small to render such operation desirable.

The invention also relates to apparatus in the use of which such method, or any other method for which the apparatus is suitable, may be efficiently performed.

With special objects in view, as well as other advantages which may be incident to the use of the method or apparatus, the invention consists in the parts and combinations, and method of procedure hereinafter set forth and claimed, with the understanding that the several necessary elements constituting the same may be varied in proportions and arrangement without departing from the nature and scope of the invention.

In order to make the invention more clearly understood, there are shown in the accompanying drawings means for carrying the same into practical effect, without limiting the improvements, in their useful applications, to the practical constructions which, for the purpose of explanation, have been made the subject of illustration in the said drawings.

Figure 1 is a side view of the rear portion of a machine embodying the invention.

Fig. 2 is a similar view of the front portion of the machine.

Fig. 3 is a plan view of the rear portion of the machine.

Fig. 4 is a similar view of the front portion of the machine.

Fig. 5 is a front elevation of the same.

Fig. 6 is a vertical cross section of the machine on line VI—VI of Fig. 2.

Figs. 7 and 8 are diagrammatic views, in cross section, of the fish holding conveying bucket, showing different forms of the same.

Fig. 9 is an elevation of a portion of the gearing for driving the conveyer and the cutters, the casing being shown in section.

Fig. 10 is an elevation illustrating a cutter and means for rotating the same.

Fig. 11 is a vertical cross section of a portion of the machine on line XI—XI of Fig. 1.

Fig. 12 is a similar view on the same line of section, which is marked also XII—XII in Fig. 1, the parts being shown in another position.

Fig. 13 is a vertical cross section of a portion of the machine, showing the conveying buckets at their maximum raised or elevated positions.

Fig. 14 is an isometric view indicating the general construction of the chain, block and bucket bottom units.

Fig. 15 is an isometric view of two units of conveyer chain, illustrating their pivotal connection with block.

Fig. 16 is a partial view in section of a bucket illustrating method of attaching wire screen to bucket.

Referring to the drawing, A is an endless chain conveyer mounted to run in a substantial horizontal direction over sprockets 1 mounted on front and rear shafts 2 and 3. These shafts are mounted in suitable bearings on a frame B. The conveyer comprises tilting buckets 4 which, when preferably in horizontal position, receive the fish from a chute 5 or other means of supply. From the chute the fish are delivered to substantially the middle of the conveyer on the top of the buckets, so that they will readily find their way into the different buckets as the latter advance under the chute. The buckets are arranged half at one side of the conveyer and half at the other side of the conveyer and are so mounted that at a predetermined time the inner ends of the buckets may be tilted upward to cause a final outward sliding of the fish, if it be necessary, and the buckets are then restored to horizontal position and proceed onward to the means for cutting off the heads of the fish, or for cutting off both their heads and tails, as illustrated.

At a point under or near the chute 5 the buckets are acted upon to be rapidly reciprocated horizontally and in directions transverse to the direction of travel of the conveyer, which rate of reciprocation is or may be about 220 times per minute. This horizontal vibration of the bucket is preferably caused at points where the buckets are horizontal, and has the effect to sift out the fish into two groups, one group in the buckets at one side of the conveyer and the other group in the buckets at the other side of the conveyer. As the buckets travel and are thus rapidly reciprocated endwise, the fish of both groups work down into their respective buckets, and by the concave shape of the buckets are guided into position parallel with the buckets and with the direction of reciprocation. The effect of this reciprocation is such that each individual fish is moved endwise and in the direction of its head, so that each group of fish will finally become arranged in its series of buckets with their heads pointed outward toward the side of the machine, their tails being toward the middle of the machine. That is to say, all of the fish are caused to work away from the central line of the machine in the buckets and head first toward the side of the machine, so that each group of fish has a uniform arrangement.

At a point near the front end of the machine the inner ends of both groups of buckets are caused to be tilted upward to an angle to promote the further outward sliding of the fish up to planes for gaging and cutting. This position of the buckets is illustrated in Fig. 2. Suitable means are provided for arresting the fish when they have moved sufficiently outward, and in the construction illustrated each bucket is provided with its own gage shown as consisting of a small vertical plate 6 affixed in the bucket near its outer end. The further travel of the conveyer allows the buckets to reassume horizontal positions and they are then carried to rotary cutting knives 7 by which the fish are decapitated; and the machine illustrated also comprises similar rotary cutters 8 so arranged that they will sever the tails of the fish. Further travel of the conveyer delivers the bodies, heads and tails of the fish over the end of the conveyer, as shown in Fig. 5, where the said parts will be caught in suitable chutes, troughs or receptacles (not shown).

Before the fish are operated upon, as above described, they are preferably graded according to length, so that the fish of any grade operated upon will all be within about an inch of the same length. The machine will be constructed and adjusted for a certain grade of fish, and for other grades or lengths the cutters 7 and 8 will be suitably adjusted transversely of the machine; and for extreme differences in grades the buckets may be changed, if required.

The number of fish that will accumulate in any one bucket will depend upon the rate of feeding the fish by the chute 5, and there will usually be variation in the number of fish in each bucket, and in practice from one to eight or more fish may be received, carried, gaged and cut in a single bucket. The rate of operation of the machine is thus very rapid and accommodates itself readily to the rate of feeding the fish.

Power is applied to the machine through a shaft 9 which extends from side to side of the machine, mounted in bearings 10, and having fast and loose pulleys 11. A pinion 12 on said shaft rotates a train of gearing (Fig. 9) comprising an idler 13, gear 14, pinion 15 and gear 16, the latter being fixed on the conveyer shaft 2 and actuating the conveyer sprockets and the conveyer. The cutters 7 and 8 are fixed on short shafts 17 mounted in vertically swingable radius bars 18, the other ends of said bars being pivoted on the shaft 2 (Fig. 10), and sprockets 19 fixed on said shafts are connected by chains 20 whereby the cutters are rotated at a suitable speed, which may be about 440 revolutions per minute. The power connections last mentioned are inclosed in casings 21, and the gearing above described is inclosed in a casing 22.

The conveyer illustrated comprises two side chains composed of links 23, 24 connected by horizontal and transverse pivots 25 and by alternating vertical pivots 26. The latter form journals for blocks 27 and these blocks are jointed to the bucket bottoms 28 by horizontal longitudinal pivots 29. The bottoms 28 extend from side to side of the machine and are supported by longitudinal side tracks 30 and a central track 31. At the middle of the machine the said bottoms are formed with a joint the parts of which are united by a horizontal longitudinal pivot 32 so that said joint may buckle upward and form the buckets 4 into two series of buckets inclining outward and downward, one series to one side of the machine and the other series toward the other side of the machine (Figs. 2 and 13). The joints at 32 are caused to buckle upward by a fixed central cam track 33 (Fig. 13) and are further elevated by means which push inward the outer ends of the buckets. Said means consists of a pair of inwardly bent rails, or angle irons 34 (Fig. 4) which are carried by the outer ends 35 of two cross bars 36 which extend from side to side of the machine under the tracks 30 and 31, and the blocks 27 bear outwardly against said rails 34. The bars 36 are carried on longitudinal rollers 37 which are contained in sockets 38 of said bars and which roll on flat bracket plates 39 on the frame B. The rear portions 34' of the rails 34 are straight and parallel with each other to confine the buckets when the latter are horizontal (Fig. 3). The buckets are reciprocated endwise, in a direction crosswise of the carrier, by pitmen 40 pivoted at 41 to the bars 36 and operated by eccentrics 42 on a longitudinal shaft 43. The latter is rotated by a spiral gear 44 and spiral pinion 45 (Fig. 2), the latter being fixed on the shaft 2. By these connections the power shaft reciprocates the rails 34 rapidly (about 220 times per minute) while they confine the outer ends of the buckets 4. At 46 are arranged two fixed rails along which the outer ends of the buckets ride, by means of the blocks 27, while the buckets are returning to horizontal position, so as to hold the buckets from reciprocation at and near the cutters. The pivots 26 allow the chain links 23 and 24 to yield sidewise as the buckets are reciprocated and as the blocks 27 pass along the rails 34 and 34' and 46.

The body of the bucket may be of any suitable construction. It is formed with front and rear sides 47 between which the bodies of the fish are alined. Preferably, but not necessarily, these sides incline or are curved downwardly toward each other (Figs. 7 and 8). The bucket body should be such as to obtain a good frictional hold on the fish, in directions toward its head and against its scales, fins and tail, and is preferably of reticulated wire, as shown, with a hem 48 of sheet metal in which the edges of the wire are clamped, and said sheet metal is secured to the bottom 28 by bolts 49. The gages 6 may be adjusted to regulate the length of head to be cut off by screws 50 fitting in any of a series of holes 51 in the bottom 28. Provision is made for the cutters to operate to a depth a little below the bottom of the bucket, and this may be by forming the bottoms 28 with grooves 52 in which the edges of the cutters may run without encountering any part of the carrier, and by interrupting the bucket sides 47 at these places, as shown at 53.

The lower or return limb of the carrier or conveyer runs in a trough 54 of water attached to the frame B, to wash off the scales and blood. The water is washed toward the rear end of the trough by the action of the conveyer and into a well 55 whence the water flows back to the front end of the trough by a pipe 56. A screen 57 is arranged between the well 55 and the pipe 56 and collects scales and all solid matters from which the conveyer is cleansed. Said screen is mounted on a frame 58 pivoted on the trough by a rock shaft 59 and may at times be thrown up, by turning the rock shaft by a handle 60, to throw such collected matters out of the tank over the rear edge of the latter.

To aid in making clear the operation of the invention, it is to be understood that the unarranged fish are fed or delivered at or near the median line of the carrier or conveyer. The action upon any fish which lies across the median line or center is to work its away from that line or center toward whichever side of the carrier its head points to. Any fish which arrives upon the carrier between the median line and one side of the carrier with its head toward that side will gradually, by small and quick movements, work away from the median line and to said side. Any fish which arrives upon the carrier between the median line and one side of the carrier with its head directed toward the median line, will work across the median line to the other side of the carrier. The individual fish thus gradually work away from the center of the carrier, or out of any mass of fish which may be deposited on the carrier, as described, all moving head first and some moving together and some moving past each other in opposite directions, till they arrive at the vertical plane of gaging, where they will be ready to be cut or to be otherwise handled, and this is performed automatically in the sense that no manual labor is required. The carrier will be such as to provide a carry of the fish long enough for the performance of these operations. The required carry will not be very long, for the transverse reciprocations are rapid, preferably about 220 complete reciprocations per minute, with a stroke of about one inch to each side of the carrier center. The carrier moves under and relative to a fish when its momentary movement is toward the fish's tail, without giving the fish much longitudinal movement; and when the momentary stroke of the carrier is toward the fish's head the scales, fins and tail are sufficiently engaged to give the fish a material longitudinal impulse and movement. A principal function of the final tilting of the buckets or bucket sections is to assemble with their noses at the plane of gaging a number of fish which have been worked out to near said plane but which may overlie or partly overlie each other, and some of which have not quite reached the desired plane. The invention is not necessarily confined to providing the carrier surface with buckets, though such provision hastens or may hasten the result; and the invention is not confined to the use of a conveyer of the kind illustrated and moving in a substantially right line, for other suitable forms of carrier may be employed according to the principle of my invention.

For the purpose of separating the fish as above described, by reciprocation, the carrier A may be considered to have a single set of long buckets extending from one side of the carrier to the other, and this is in effect the condition when the buckets are horizontal. The buckets are separated into two sets or series by said tilting up of their inner ends, but the invention is not confined to such tilting.

What is claimed is—

1. A method of positioning fish which consists in feeding the fish in unarranged condition, guiding the individual fish to assume by gravity positions along parallel lines but without distinction as to the directions of their heads and tails, and vibrating the fish by friction on their under sides in directions parallel with said lines on which the fish are arranged and thereby causing the fish to move head first and to separate into two groups, the fish of one group having their heads arranged outward in one direction and the fish of the other group having their heads arranged outward in the other direction.

2. A method of positioning fish which consists in feeding the fish in unarranged condition, guiding the individual fish to assume by gravity positions along parallel lines but without distinction as to the directions of their heads and tails, vibrating the fish by friction on their under sides in directions parallel with said lines on which the fish are arranged and thereby causing the fish to move head first and to separate into two groups, the fish of one group having their heads arranged outward in one direction and the fish of the other group having their heads arranged outward in the other direction, and conveying the fish while being so arranged.

3. A method of positioning and cutting fish which consists in feeding the fish in unarranged condition, guiding the individual fish to assume by gravity positions along parallel lines but without distinction as to the directions of their heads and tails, vibrating the fish by friction on their under sides in directions parallel with said lines on which the fish are arranged and thereby causing the fish to move head first and to separate into two groups, the fish of one group having their heads arranged outward in one direction and the fish of the other group having their heads arranged outward in the other direction at planes of gaging, conveying said groups of fish while so arranged, and cutting off the heads of the gaged fish.

4. A method of positioning and cutting fish which consists in feeding the fish in unarranged condition, guiding the individual fish to assume by gravity positions along parallel lines but without distinction as to the directions of their heads and tails, vibrating the fish by friction on their under sides in directions parallel with said lines on which the fish are arranged and thereby causing the fish to move head first and to separate into two groups, the fish of one group having their heads arranged outward in one direction and the fish of the other group having their heads arranged outward in the other direction, conveying said groups of fish while so arranged, further sliding the fish of each group head first by gravity to a plane of gaging, and cutting off the heads of the gaged fish.

5. A method of positioning fish, which consists in giving to the fish rapid intermittent impulses in different directions, the impulses toward the tails of the fish having little effect to move the fish, and the impulses toward the heads of the fish acting to move them head first.

6. A method of positioning fish, which consists in giving to the fish rapid intermittent impulses in different directions, and alining the fish with the directions of said impulses, the impulses toward the tails of the fish having little effect to move the fish, and the impulses toward the heads of the fish acting to move them head first.

7. A method of positioning fish, which consists in giving to the fish rapid intermittent impulses in different directions, the impulses toward the tails of the fish having little effect to move the fish, and the impulses toward the heads of the fish acting to move them head first, and conveying the fish while subjected to said impulses.

8. A fish support having a reticulated surface, means for reciprocating said support, means for guiding fish endwise on said surface, means for gaging the fish, a fish cutter, and means for advancing said support relative to the cutter.

9. In a machine for positioning and cutting fish, in combination; a horizontal carrier having means for alining fish horizontally with their heads arranged in definite directions, means for reciprocating said carrier in the directions in which the fish extend, means for gaging the fish, and means for cutting the gaged fish.

10. In a machine for positioning and cutting fish, in combination; an endless chain carrier having means for alining fish horizontally and transversely of the carrier, means for reciprocating the alining means in directions crosswise to the direction of movement of the carrier and grouping the fish heads outward at the sides of the carrier, means for gaging the fish, and means for cutting the gaged fish.

11. In a machine for positioning and cutting fish, in combination; an endless chain carrier, comprising a series of buckets extending horizontally and transversely of the conveyer, means for vibrating said buckets rapidly endwise in directions crosswise to the direction of movement of the carrier and means for gaging the fish in said buckets.

12. In a machine for positioning and cutting fish, in combination; an endless chain carrier, comprising a series of buckets extending horizontally and transversely of the conveyer, means for vibrating said buckets rapidly endwise in directions crosswise to the direction of movement of the carrier, means for gaging the fish in said buckets, and means for cutting the gaged fish.

13. In a machine for positioning and cutting fish, in combination; an endless chain carrier, comprising a series of buckets extending laterally relative to the conveyer, means for reciprocating said buckets in directions crosswise to the direction of movement of the carrier, means for tilting the inner ends of said buckets upward, and means for gaging the fish in said buckets.

14. In a machine for positioning and cutting fish, in combination; an endless chain carrier comprising two series of buckets extending laterally in opposite directions, means for reciprocating said buckets in directions crosswise to the direction of movement of the carrier, means for tilting the inner ends of said buckets upward and means for gaging the fish in said buckets.

15. In a machine for positioning and cutting fish, in combination; an endless chain carrier comprising two series of buckets extending laterally in opposite directions, a support for said carrier, means for reciprocating said buckets relative to said support, and in directions crosswise to the direction of movement of the carrier, means for tilting the inner ends of said buckets upward, means for gaging the fish in said buckets, and means for cutting the gaged fish.

16. In a machine for positioning and cutting fish, in combination; an endless chain carrier comprising two series of buckets extending laterally in opposite directions, means for reciprocating said buckets in directions crosswise to the direction of movement of the carrier, means for tilting the inner ends of said buckets upward, means for gaging the fish in said buckets, and means for cutting the gaged fish.

17. An endless fish positioning carrier comprising longitudinal chains and fish-holders connected with the chain elements, the chain elements being connected with each other by transverse pivots and by vertical pivots.

18. An endless fish carrier having side chains and transverse fish-holding bucket sections, longitudinal pivots uniting the inner ends of said sections, means for elevating the inner ends of said sections, means for reciprocating said sections transversely to the carrier, longitudinal pivots uniting the outer ends of said sections with the elements of said chains, and vertical and transverse pivots connecting the chain elements with each other.

19. The combination of a carrier having a downwardly inclined fish-supporting surface, a gage at the lower part of said surface, a cutter operating near said gage, and means for reciprocating the carrier in directions crosswise of its direction of movement and toward and from the higher and lower parts of said surface.

In testimony whereof I affix my signature hereto.

WILLIAM F. BUTLER.